United States Patent
Takehara et al.

(10) Patent No.: US 9,501,858 B2
(45) Date of Patent: Nov. 22, 2016

(54) DISPLAY DEVICE AND COMPUTER

(75) Inventors: Takayoshi Takehara, Tokyo (JP); Atsushi Hori, Tokyo (JP); Shinya Taguchi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 29 days.

(21) Appl. No.: 14/370,593

(22) PCT Filed: May 28, 2012

(86) PCT No.: PCT/JP2012/003465
§ 371 (c)(1),
(2), (4) Date: Jul. 3, 2014

(87) PCT Pub. No.: WO2013/179331
PCT Pub. Date: Dec. 5, 2013

(65) Prior Publication Data
US 2014/0354653 A1    Dec. 4, 2014

(51) Int. Cl.
*G06T 13/80* (2011.01)
*G06F 3/14* (2006.01)
*G06T 13/00* (2011.01)

(52) U.S. Cl.
CPC ............ *G06T 13/80* (2013.01); *G06F 3/1423* (2013.01); *G06T 13/00* (2013.01); *G06T 2213/04* (2013.01); *G09G 2340/0407* (2013.01)

(58) Field of Classification Search
CPC ...... G06T 13/80; G06T 2213/04; G09G 5/00
See application file for complete search history.

(56) References Cited

U.S. PATENT DOCUMENTS

| | | | |
|---|---|---|---|
| 5,404,437 A | | 4/1995 | Nguyen |
| 5,842,004 A | * | 11/1998 | Deering ................. G06T 9/001 345/419 |
| 5,987,256 A | * | 11/1999 | Wu ........................ G06F 9/445 717/118 |
| 2003/0098862 A1 | | 5/2003 | Hunt et al. |
| 2004/0160445 A1 | * | 8/2004 | Whatmough ..... G06F 17/30905 345/473 |
| 2005/0174364 A1 | | 8/2005 | Malmstrom |
| 2009/0284787 A1 | * | 11/2009 | Imai .................. H04N 1/00408 358/1.15 |
| 2010/0118034 A1 | | 5/2010 | Kim |
| 2010/0271397 A1 | | 10/2010 | Feldstein et al. |

FOREIGN PATENT DOCUMENTS

| | | |
|---|---|---|
| JP | 7 20849 | 1/1995 |
| JP | 10 232953 | 9/1998 |
| JP | 2000 293151 | 10/2000 |
| JP | 2007 522565 | 8/2007 |

OTHER PUBLICATIONS

International Search Report Issued Aug. 21, 2012 in PCT/JP12/003465 Filed May 28, 2012.

* cited by examiner

*Primary Examiner* — James A Thompson
*Assistant Examiner* — Tapas Mazumder
(74) *Attorney, Agent, or Firm* — Oblon, McClelland, Maier & Neustadt, L.L.P.

(57) ABSTRACT

A display device converts an animation file into first binary data in a data format which can be processed by a first graphics library of a first display, the binary data including a DL, and converts the converted first binary data into second binary data in a data format which can be processed by a second graphics library of a second display.

6 Claims, 3 Drawing Sheets

DISPLAY DEVICE AND COMPUTER

FIELD OF THE INVENTION

The present invention relates to a display device that renders binary data into which an animation file is converted by a computer by using a display, and plays back an animation.

BACKGROUND OF THE INVENTION

For example, patent reference 1 discloses a device that mixes an animation sequence with computer graphics in order to display an animation on a computer display screen.

RELATED ART DOCUMENT

Patent Reference

Patent reference 1: Japanese Unexamined Patent Application Publication No. H7-20849

SUMMARY OF THE INVENTION

Problems to be Solved by the Invention

A problem with the conventional technology represented by patent reference 1 is that in a process of decompressing an animation sequence to provide pixel information, when an animation sequence generator (e.g., a display) does not comply with the data format of an animation to be played back, the animation sequence generator cannot play back this animation.

The present invention is made in order to solve the above-mentioned problem, and it is therefore an object of the present invention to provide a display device that, even if the display device has a display having a data format in which to be able to perform a playback process of playing back a video, such as an animation, and which differs from the original data format of the video, can perform the playback process without adding any large-scale structure.

Means for Solving the Problem

In accordance with the present invention, there is provided a display device including: a plurality of displays each including an GUI application that generates a GUI (Graphical User Interface), a graphics library that expands a display list included in binary data specified in the GUI generation by the GUI application in a memory, a graphics engine that renders the display list which is expanded in the memory by the graphics library, and a display unit that displays an image which is a result of the rendering by the graphics engine; and a computer including an animation converter that converts an animation file into binary data in a data format which can be processed by the graphics library of either one of the plurality of the displays, the binary data including the display list, and a DL converter that converts the binary data into which the animation file is converted by the animation converter into binary data in a data format which can be processed by the graphics library of a remaining one of the plurality of displays.

Advantages of the Invention

In accordance with the present invention, there is provided an advantage of being able to perform a playback process on a display without adding any large-scale structure even though the display has a data format in which to be able to perform the playback process of playing back a video, such as an animation, and which differs from the original data format of the video.

EMBODIMENTS OF THE INVENTION

Hereafter, in order to explain this invention in greater detail, the preferred embodiments of the present invention will be described with reference to the accompanying drawings.

Embodiment 1.

Figure 1:
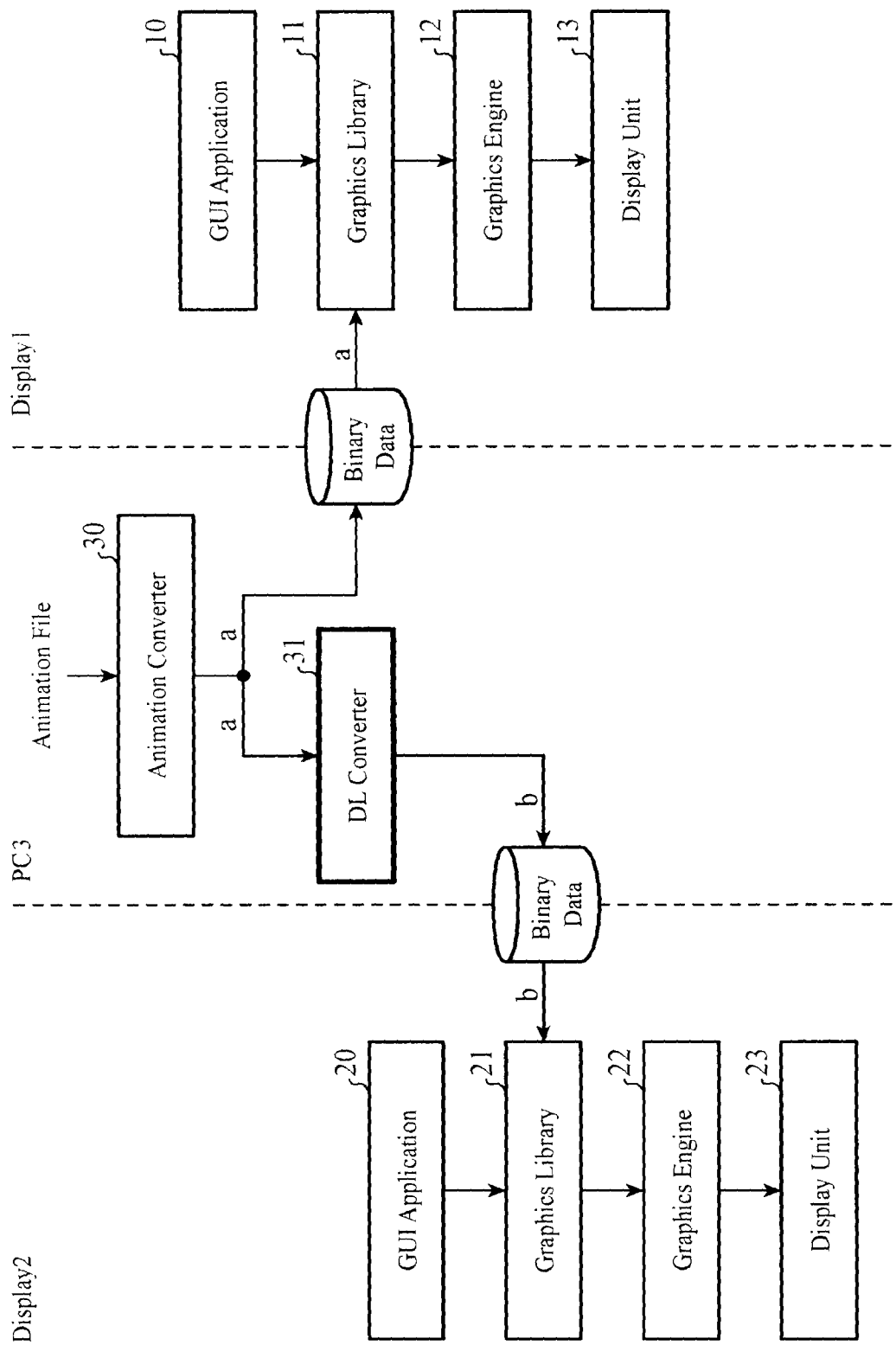
FIG. 1 is a view showing the structure of a display device in accordance with Embodiment 1 of the present invention.

FIG. 1 is a view showing the structure of a display device in accordance with Embodiment 1 of the present invention. The display device shown in FIG. 1 is provided with displays 1 and 2 and a computer (referred to as a PC from here on) 3. The display 1 is provided with a GUI application 10, a graphics library 11, a graphics engine 12, and a display unit 13. Further, the display 2 is similarly provided with a GUI application 20, a graphics library 21, a graphics engine 22, and a display unit 23.

The GUI applications 10 and 20 generates GUIs. When generating GUIs, the GUI applications 10 and 20 further specify binary data about animations to be displayed on GUI screens by the display units 13 and 23 and provide GUIs including the animations, respectively.

The graphics libraries 11 and 21 read binary data a and b into which an animation file is converted by the PC 3 according to commands from the GUI applications 10 and 20, extract display lists (referred to as DLs from here on) from the binary data a and b and expand the display lists in a VRAM (video RAM), and set values required for rendering of the DLs to the registers of the graphics engines 12 and 22, respectively. It is assumed that the data formats of the binary data which the graphics libraries 11 and 21 handle differ from each other. More specifically, the binary data a which an animation converter 30, which will be mentioned below, acquires from the animation file cannot be subjected to the above-mentioned process which the graphics library 21 performs while keeping the binary data in its original format.

The graphics engines 12 and 22 render the DLs in the VRAM on the basis of the values which are set to the registers by the graphics libraries 11 and 21, respectively. The display units 13 and 23 display the results of the rendering by the graphics engines 12 and 22 on the screens thereof, respectively. For example, the animations which are the results of the rendering are played back.

The PC 3 is provided with the animation converter 30 and a DL converter 31. The animation converter 30 converts the animation file into the binary data a including the DL which is a command group used for the rendering. In this embodiment, the animation converter 30 generates the binary data having a data format which can be processed by the graphics library 11 of the display 1.

The DL converter 31 converts the binary data a into which the animation file is converted by the animation converter 30 into binary data b having a data format which can be processed by the graphics library 21 of the display 2. For example, the data format which can be processed by the graphics library 21 of the display 2, in addition to the data format which can be processed by the graphics library 11, is preset for the DL converter 31, and the DL converter converts the data format according to whether the display which plays back the animation is either the display 1 or the display 2.

Next, the operation of the display device will be explained. First, the PC 3 receives an animation file, such as an SWF (Shock Wave Flash; registered trademark) file. The animation converter 30 converts the inputted animation file into binary data a including a DL which can be rendered by the graphics engine 12 of the display 1. Further, when playing back the animation on the display 2, the DL converter 31 converts the binary data a acquired by the animation converter 30 into binary data b having a data format which can be processed by the graphics library 21 of the display 2.

The display 1 then performs a playback process of playing back the animation by using the binary data a converted by the animation converter 30. More specifically, the GUI application 10 specifies the binary data a about the video which is to be played back by using a GUI from among the binary data acquired by the animation converter 30, and commands the graphics library 11 to perform the process. The graphics library 11 reads the specified binary data a according to the command from the GUI application 10, extracts the DL from this binary data a, expands the DL in the VRAM, and sets the value required for rendering of the DL to the register of the graphics engine 12. The graphics engine 12 renders the DL in the VRAM on the basis of the value which is set to the register by the graphics library 11. The display unit 13 displays the animation which is the result of the rendering by the graphics engine 12 on the screen thereof.

On the other hand, the display 2 performs a playback process of playing back the animation by using the binary data b whose data format is converted by the DL converter 31. As examples of the conversion of the data format, there are conversion of animation data into data consisting of a plurality of still images, conversion of compressed graphic data into uncompressed graphic data, and conversion into a format having a different graphical hierarchical structure. More specifically, the GUI application 20 specifies the binary data b about the video which is to be played back by using a GUI from among the binary data acquired by the DL converter 31, and commands the graphics library 21 to perform the process. The graphics library 21 reads the specified binary data b according to the command from the GUI application 20, extracts the DL from this binary data b, expands the DL in the VRAM, and sets the value required for rendering of the DL to the register of the graphics engine 22. The graphics engine 22 renders the DL in the VRAM on the basis of the value which is set to the register by the graphics library 21. The display unit 23 displays the animation which is the result of the rendering by the graphics engine 22 on the screen thereof.

As mentioned above, the display device in accordance with this Embodiment 1 includes: the displays 1 and 2 having the GUI applications 10 and 20 that generate GUIs, the graphics libraries 11 and 21 that expand DLs included in the binary data specified through the GUI generation by the GUI applications 10 and 20 in the VRAM, the graphics engines 12 and 22 that render the DLs expanded by the graphics libraries 11 and 21 in the VRAM, and the display units 13 and 23 that display images which are the results of the rendering by the graphics engines 12 and 22; and the PC 3 having the animation converter 30 that converts an animation file into binary data a in a data format which can be processed by the graphics library 11 of the display 1, the binary data including the DL, and the DL converter 31 that converts the binary data a into which the animation file is converted by the animation converter 30 into binary data b in a data format which can be processed by the graphics library 21 of the display 2. Because the display device is constructed this way, the binary data a which the animation converter 30 converts for, for example, the display 1 can be applied also to the display 2. More specifically, even a display having a data format in which to be able to perform a process of playing back a video, such as an animation, and which differs from the original data format of the video can perform the playback process. Further, because what is necessary is to perform only the conversion of the data format of the binary data and add the DL converter 31 which can be added to the display device via software, there is no necessity to newly dispose a large-scale animation converter used for the display 2, and the amount of work needed for development can be reduced greatly.

Although in above-mentioned Embodiment 1 the case in which the display device in accordance with Embodiment 1 includes the displays 1 and 2 is shown, the display device can have three or more displays. In this case, when the display which plays back an animation is other than the display 1, the DL converter 31 converts the binary data a acquired by the animation converter 30 into binary data having a data format which can be processed by the graphics library of the display which plays back the animation (including a plurality of displays other than the display 1).

Embodiment 2.

Although in above-mentioned Embodiment 1 the case in which the DL converter 31 converts the data format of binary data is shown, this Embodiment 2 shows an embodiment of correcting a DL according to the display performance of each display.

Figure 2:
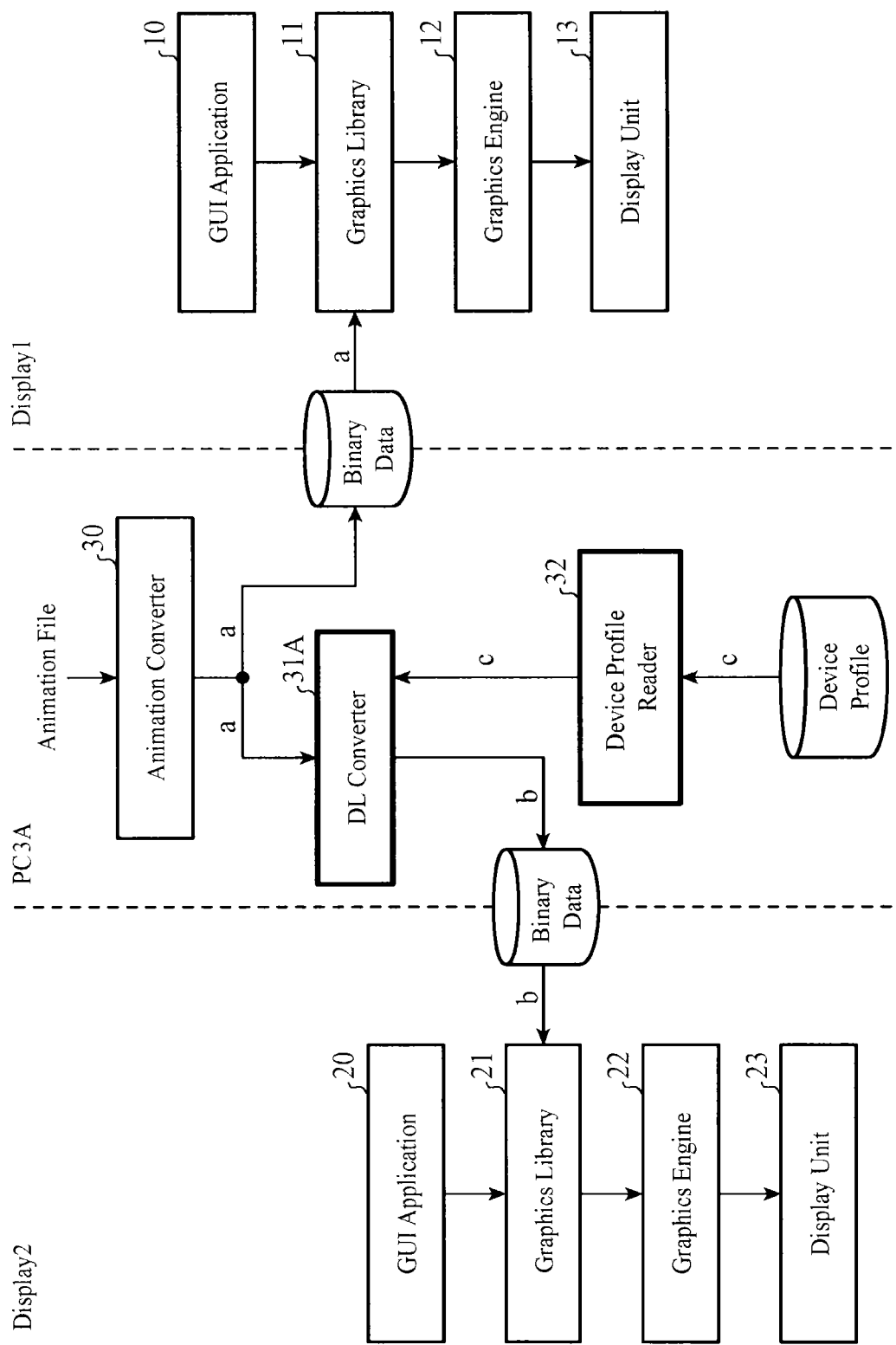
FIG. 2 is a view showing the structure of a display device in accordance with Embodiment 2 of the present invention.

FIG. 2 is a view showing the structure of a display device in accordance with Embodiment 2 of the present invention. The display device shown in FIG. 2 is provided with displays 1 and 2 and a PC 3A. The displays 1 and 2 are the same as those shown in FIG. 1. The PC 3A is constructed in such a way as to include an animation converter 30, a DL converter 31A, and a device profile reader 32. The animation converter 30 converts an inputted animation file into binary data a including a DL which is a drawing command group which can be rendered by, for example, a graphics engine 12 of the display 1.

The DL converter 31A converts the binary data a acquired by the animation converter 30 into binary data b having a data format which can be processed by a graphics library 21 of the display 2, like that according to above-mentioned Embodiment 1. The DL converter 31A further acquires a device profile c showing the display performance of the display 2 from the device profile reader 32, and corrects the DL included in the binary data b whose data format is converted for the display 2 according to the display performance of the display 2.

The device profile reader 32 acquires the device profile c showing the display performance of the display (in this case, the display 2) for which the data format of the binary data to be used is converted into a compliant data format by the DL converter 31A. For example, information showing the display performance of the display 2 is stored beforehand in a storage or storage area from which the information can be read by the device profile reader 32. Further, as the information showing the display performance of the display 2, the screen size or the resolution of the display 2, the colorimetry data about colors outputted from the display 2, or the like can be provided.

Figure 3:
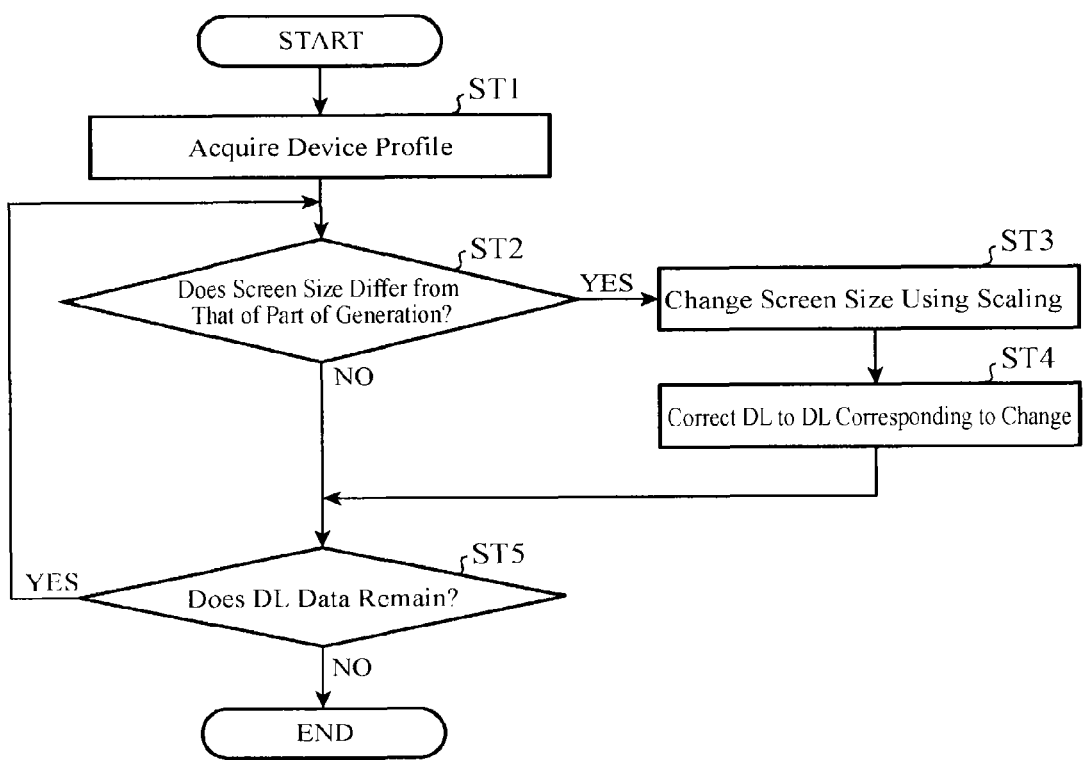
FIG. 3 is a flow chart showing the operation of the display device in accordance with Embodiment 2.

Next, the operation of the display device will be explained. FIG. 3 is a flow chart showing the operation of the display device in accordance with Embodiment 2, and the operation of the DL converter 31A of the PC 3A and that of the device profile reader 32 will be explained with reference to this FIG. 3. Hereafter, a case in which the device profile c is the screen size of the display 2 will be explained as an example. First, the DL converter 31A converts the binary data a acquired by the animation converter 30 into binary data b having a data format which can be processed by the graphics library 21 of the display 2 in the same way that the DL converter according to above-mentioned Embodiment 1 does. Next, the DL converter 31A acquires the device profile c of the display 2 from the device profile reader 32 (step ST1). The DL converter 31A sequentially analyzes DL data included in the binary data b to determine whether the screen size shown by the DL and the command in the DL (the screen size specified by the part of generation of the animation file) differs from the screen size shown by the device profile c (step ST2).

When the screen sizes differ from each other (when YES in step ST2), the DL converter 31A changes the screen size by enlarging or reducing the screen (step ST3), and corrects the DL to a DL compliant with the change (step ST4). Further, when the screen sizes are the same as each other (when NO in step ST2) or when correcting the DL in step ST4, the DL converter 31A determines whether DL data on which the above-mentioned process is not performed exist in the DL data included in the binary data b (step ST5). When yet-to-be-processed DL data exists (when YES in step ST5), the DL converter returns to step ST2 and repeats the above-mentioned process. In contrast, when the process has been performed on all the DL data included in the binary data b (when NO in step ST5), the DL converter ends the process.

As mentioned above, the display device in accordance with this Embodiment 2 includes the device profile reader 32 that acquires a device profile showing the display performance of the display 2, and the DL converter 31A corrects the DLs included in the binary data b whose data format is converted on the basis of the device profile c acquired by the device profile reader 32 and according to the display performance of the display 2 corresponding to the converted data format. By doing this way, the display device can produce a display of an animation according to the display performance (e.g., screen size) of each display.

Further, although in above-mentioned Embodiment 2 the case in which the display device in accordance with Embodiment 2 includes the displays 1 and 2 is shown, the display device can have three or more displays. In this case, when the display which plays back an animation is other than the display 1, the DL converter 31A converts the binary data a acquired by the animation converter 30 into binary data having a data format which can be processed by the graphics library of the display which plays back the animation (including a plurality of displays other than the display 1). Further, the DL converter 31A acquires the device profile c of the display corresponding to the converted data format (including a plurality of displays other than the display 1) from the device profile reader 32, and corrects the DLs included in the binary data b on the basis of the device profile c of each display and according to the display performance of the display corresponding to the converted data format.

While the present invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

Because the display device in accordance with the present invention can perform a playback process on a display without adding any large-scale structure even though the display has a data format in which to be able to perform the playback process of playing back a video, such as an animation, and which differs from the original data format of the video, the display device is suitable for various information processing devices having a display.

EXPLANATIONS OF REFERENCE NUMERALS

1 and 2 display, 3 and 3A computer (PC), 10 and 20 GUI application, 11 and 21 graphics library, 12 and 22 graphics engine, 13 and 23 display unit, 30 animation converter, 31 and 31A DL converter, 32 device profile reader.

The invention claimed is:

1. A display device comprising:
   a plurality of displays each including a GUI application that generates a GUI (Graphical User Interface), a graphics library that expands, in a memory, a display list included in binary data specified by said GUI application, a graphics engine that renders the display list which is expanded in said memory by said graphics library, and a display unit that displays an image which is a result of the rendering by said graphics engine; and
   a computer including an animation converter that converts an animation file into first binary data in a first data format which can be processed by said graphics library of a first one of said plurality of said displays, said binary data including said display list, and a DL converter that converts said first binary data into second binary data in a second data format, which is different from the first data format, and which can be processed by the graphics library of a second one of said plurality of displays.

2. The display device according to claim 1, further comprising a device profile reader that acquires a device profile showing display performance of the second one of the plurality of displays,
   wherein said DL converter corrects the display list in dependence on the display performance of the second one of the plurality of displays, which is indicated in the device profile acquired by the device profile reader, the display list to be corrected being included in the second binary data.

3. The display device according to claim 1, wherein the second binary data in the second data format cannot be processed by the graphics library of the first one of the plurality of displays.

4. A computer comprising:
   an animation converter that converts an animation file into first binary data in a first data format which can be processed by a graphics library of a first one of a plurality of displays having a graphics library that expands a display list included in binary data specified by a GUI (Graphical User Interface) application in a memory, said binary data including said display list; and a DL converter that converts said first binary data into second binary data in a second data format, which is different from the first data format, and which can be processed by a graphics library of a second one of said plurality of displays.

5. The computer according to claim 4, further comprising a device profile reader that acquires a device profile showing display performance of the second one of the plurality of displays, wherein said DL converter corrects the display list in dependence on the display performance of the second one of the plurality of displays, which is indicated in the device profile acquired by the device profile reader, the display list to be corrected being included in the second binary data.

6. The computer according to claim 4, wherein the second binary data in the second data format cannot be processed by the graphics library of the first one of the plurality of displays.

* * * * *